US012810001B2

(12) United States Patent
Singh et al.

(10) Patent No.: US 12,810,001 B2
(45) Date of Patent: Nov. 24, 2026

(54) PROTECTING COMPUTER RESOURCES USING A PRIVILEGED DOMAIN AND MULTIPLE DEVICES

(71) Applicant: Samsung Electronics Co., Ltd., Suwon-si (KR)

(72) Inventors: Baibhav Singh, Cupertino, CA (US); Hayawardh Vijayakumar, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 187 days.

(21) Appl. No.: 18/223,814

(22) Filed: Jul. 19, 2023

(65) Prior Publication Data

US 2024/0378303 A1 Nov. 14, 2024

Related U.S. Application Data

(60) Provisional application No. 63/465,459, filed on May 10, 2023.

(51) Int. Cl.
*H04L 29/06* (2006.01)
*G06F 21/60* (2013.01)
*G06F 21/62* (2013.01)

(52) U.S. Cl.
CPC ............ *G06F 21/62* (2013.01); *G06F 21/604* (2013.01)

(58) Field of Classification Search
CPC ........................................................ G06F 21/62
See application file for complete search history.

(56) References Cited

U.S. PATENT DOCUMENTS

| | | | | |
|---|---|---|---|---|
| 8,225,103 | B2 | 7/2012 | Chiou | |
| 9,692,784 | B1 * | 6/2017 | Nenov | H04L 63/1416 |
| 10,783,728 | B1 | 9/2020 | Mhaske | |
| 11,113,404 | B2 | 9/2021 | Callaghan | |
| 11,190,356 | B2 | 11/2021 | Thaler, III | |
| 11,586,750 | B2 | 2/2023 | Lombardi | |
| 11,855,997 | B1 * | 12/2023 | Adam | H04L 63/102 |
| 2012/0255010 | A1 * | 10/2012 | Sallam | H04L 63/0227 726/24 |
| 2012/0311696 | A1 * | 12/2012 | Datsenko | G06F 21/6218 726/17 |
| 2018/0357445 | A1 * | 12/2018 | Kowalik | H04W 12/08 |
| 2023/0010098 | A1 | 1/2023 | de Sousa Marchese | |
| 2023/0016018 | A1 * | 1/2023 | Agarwal | H04L 63/0236 |
| 2023/0024967 | A1 | 1/2023 | Sharp | |

* cited by examiner

*Primary Examiner* — Jason K Gee

(57) ABSTRACT

In one embodiment, a method includes applying, by a security program executing on a computing device, a set of rules for one or more system resources of the computing device. Each rule defines access to at least one of the system resources. The method includes receiving, by the computing device, a request from a process on the computing device to access at least one of the system resources identified in the set of rules; transmitting, by the computing device, an access request to a second security program executing on a second computing device; receiving, from the second security program, a response to the access request; and providing, by the security program and to the process on the computing device, access to the at least one system resource according to the received response.

20 Claims, 5 Drawing Sheets

PROTECTING COMPUTER RESOURCES USING A PRIVILEGED DOMAIN AND MULTIPLE DEVICES

PRIORITY CLAIM

This application claims the benefit under 35 U.S.C. § 119 of U.S. Provisional Patent Application 63/465,459 filed May 10, 2023.

TECHNICAL FIELD

This application generally relates to protecting computer resources using a privileged domain and multiple devices.

BACKGROUND

Computing devices, such as personal computers, smartphones, etc., are targets for malicious software, also known as malware. Different types of malware are designed to target different aspects of resources that are either present on, or accessible from, a given computing device. For example, ransomware encrypts and denies access to files or other system resources, often until payment is made by a user to restore access to the encrypted resources. Spyware invades user privacy by infiltrating a device's access to hardware (such as a microphone, a camera, a GPS unit, etc.) or by tracking a user's usage of a computing device. Other types of malware install programs that perform undesirable functionality, waste system resources, or corrupt existing software installed on the computing device.

DESCRIPTION OF EXAMPLE EMBODIMENTS

Operating systems (OSes) and other programs implement various security measures to protect system resources from unauthorized access. For example, many operating systems associate different privileges with different users. For example, a typical user account may be granted less access to modify or access system resources (e.g., resources necessary to operate the operating system, confidential or sensitive resources, etc.), while a system administrator account (or the like) is granted full access to system resources and functionality. However, malicious software attacks often emulate a privileged user account or otherwise bypass these security controls, thereby effectively granting the malware unfettered access to any system resources that are accessible by the most privileged aspects of the operating system. Such system resources include files, folders, programs, and/or hardware (e.g., a microphone, camera, GPS chip, etc.). Likewise, while anti-virus or anti-malware programs executing on computing device may attempt to identify and remove or isolate malware, malware can avoid these security measure by gaining privileged access to the operating system and disabling the security measure or disguising the malware as a trusted system process.

In addition, many security controls, such as multi-factor authentication, are insufficient to protect against malware that obtains privileged access to an operating system. For example, multi-factor authentication may attempt to verify the identity of a user by transmitting an access request to a known account or device associated with the user. However, if the user authenticates their identity, then the user account (and associated OS resources) obtain access, and a comprised user account results in malware obtaining access to the system resources. In addition, malware that obtains OS-level privileges can bypass these account-based or identity-based controls, as privileged OS processes (e.g., at the kernel level) have access to all system resources that are accessible by the OS, and some malware emulates a privileged OS process.

Figure 1:
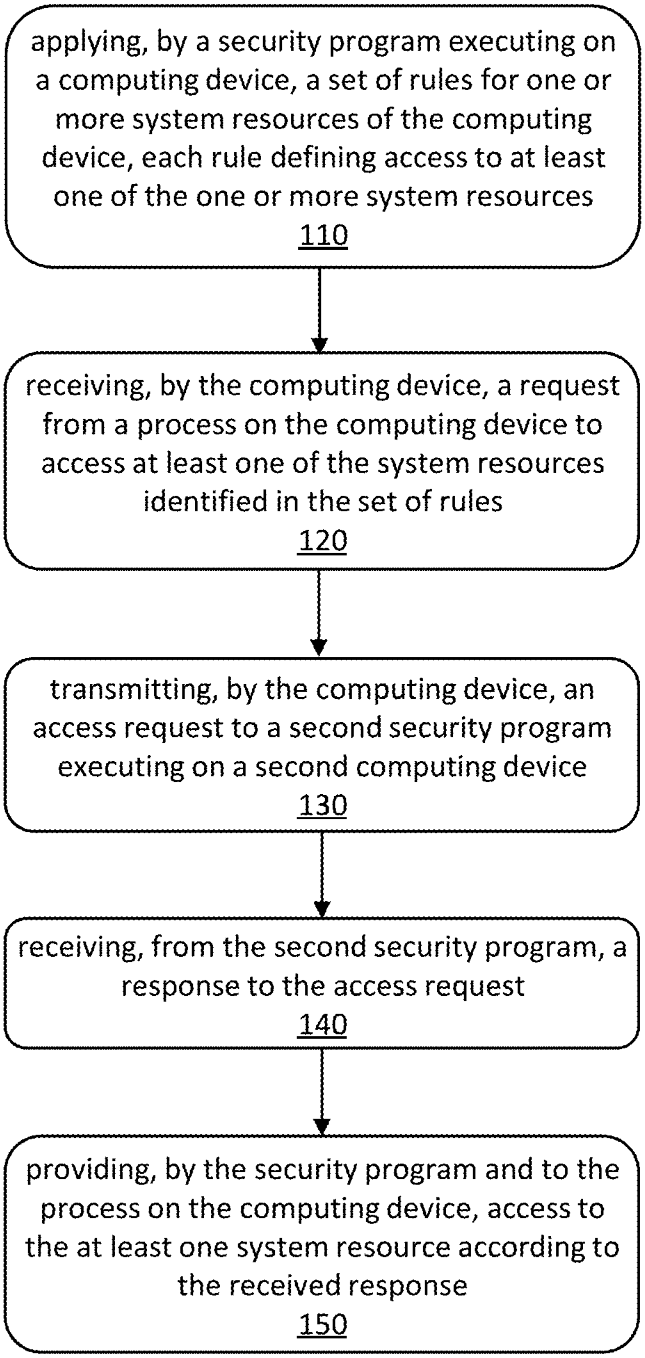
FIG. 1 illustrates an example method for protecting resources on a computing device.

The disclosure describes systems and methods that protect computing resources against malware even if the computing device is compromised by malware. FIG. 1 illustrates an example method for protecting resources on a computing device. Step 110 of the example method of FIG. 1 includes applying, by a security program executing on a computing device, a set of rules for one or more system resources of the computing device, each rule defining access to at least one of the one or more system resources. The system resources can include one or more files, folders, programs or applications, accounts, and hardware components (such as a camera, microphone, etc.). The security program executes the functions of FIG. 1 and, in particular embodiments, works in tandem with below-the-operating-system firmware (explained more fully below) to ensure that the access rules cannot be circumvented by a malicious program.

Figure 2:
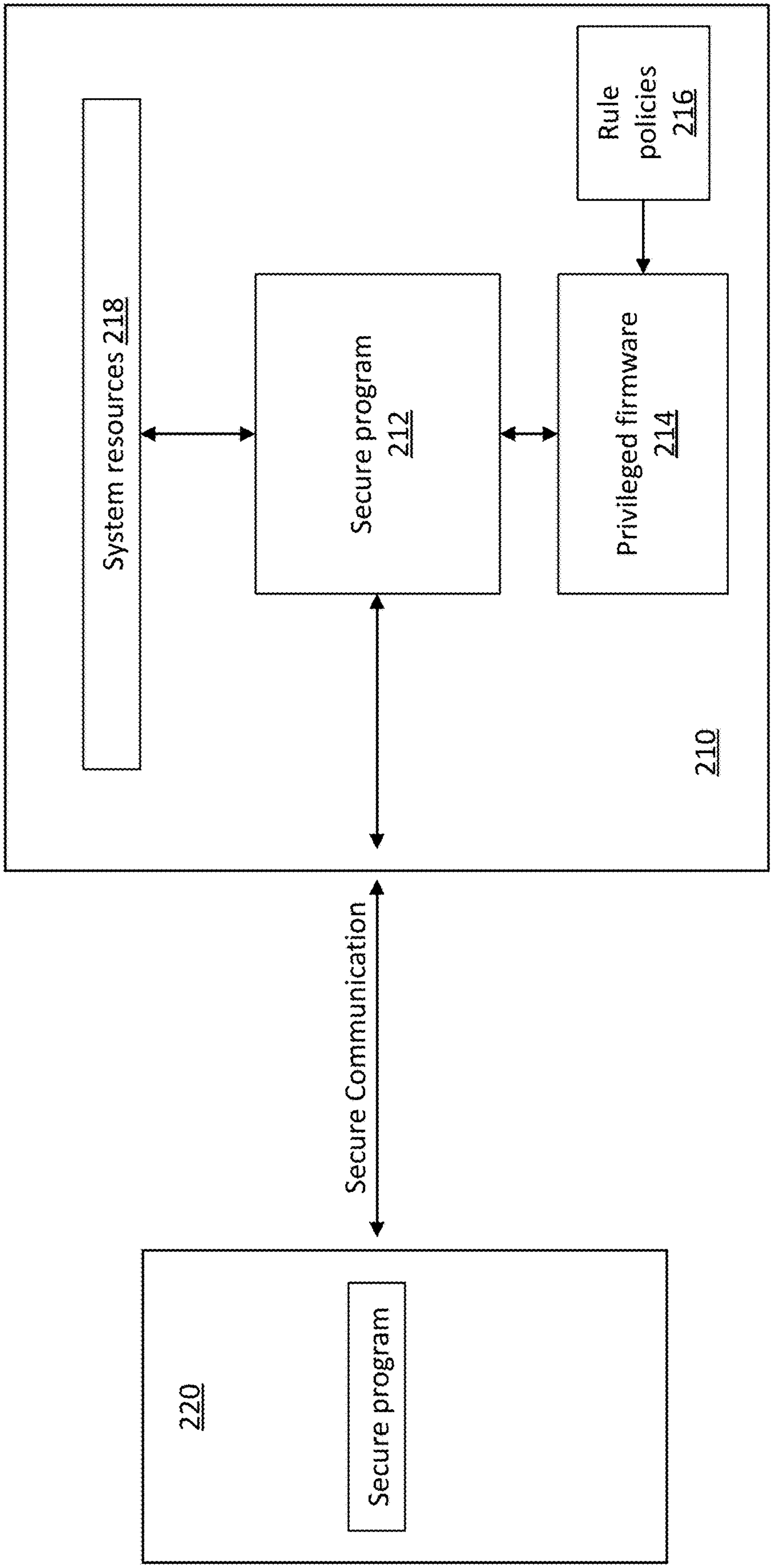
FIG. 2 illustrates an example approach for performing the example method of FIG. 1

FIG. 2 illustrates an example approach for performing the example method of FIG. 1. In the example of FIG. 2, device 210 is the computing device being protected. This disclosure contemplates that the protected computing device may be any computing device, such as a laptop, a desktop, a smartphone, a tablet, a wearable device, a TV, etc. As explained more fully below, device 220 is a companion device, and also may be any suitable computing device (e.g., a laptop, a smartphone, etc.).

As illustrated in the example of FIG. 2, device 210 executes a secure program 212. The secure program interfaces with a below-the-OS firmware to perform aspects of the security functionality described herein. The below-the-OS firmware in FIG. 2 is privileged firmware 214 that executes in, and/or has access to, computer resources (e.g., memory) that are not accessible by the OS. Such firmware may be implemented, for example, by the computer manufacturer or OEM of the core computing components (e.g., the main processors and related memory structures in the computer). Examples of the privileged firmware include a Unified Extensible Firmware Interface (UEFI) or BIOS firmware used to perform boot functions and other core functions of a computing device. This firmware has privileged access to memory and related variables that cannot be accessed by or changed by other software on the computer, including OSes executing on the computer. The privileged firmware can be implemented in hardware or in a combination of hardware and software, in particular embodiments.

The privileged firmware manages rule policies 216 for securing resources 218 on the computing device (e.g., device 210, in the example of FIG. 2). The rule policies include the set of rules that the secure program, which executes within the operating system, will enforce when access to one of those resources is requested by a process on the computing device.

As illustrated in FIG. 2, rule policies may be stored in a secure, below-the-OS space that is accessible by the privileged firmware. For example, this space may be a memory region that can only be accessed by privileged firmware. In particular embodiments, the rule policies are encrypted with a key that can only be accessed by the privileged firmware. When the computing device boots, the privileged firmware obtains the key and decrypts the rule policies. The secure program, a portion of which executes in the kernel of an OS, obtains the decrypted rule policies from the privileged firmware.

In particular embodiments, additions to the rule policies, such as by identifying specific files or folders to protect or by enhancing existing protections, may be made by a non-privileged user of the computing device. For example, a user may identify (e.g., by selecting in a user interface provided by the secure program or by the OS) one or more files or folders to protect with a rule. The requested protection will be passed to the privileged firmware, which accesses the rule policies and updates the rules by adding the requested protection.

In particular embodiments, changes other than additions to the rule policies, for example a removal of a rule or a change to rules (e.g., an increase in the amount of time access is granted to process) may require authorization by the privileged firmware. A user may implement such changes directly through the privileged firmware, in particular embodiments. For example, a user can login to an interface for managing a UEFI firmware using a password specific to that firmware, and the user can update the rule file directly using this interface (for example, by identifying the exact location of the resource to be protected and any corresponding protection options). As another example, a user can submit a request (e.g., via an interface of the secure program) to change the rule policies, and the user may be prompted for the authorization credentials to access the privileged firmware. The request and credentials may then be passed to the firmware, which authenticates the request, using the credentials, and honors the request if valid credentials are applied. As explained in this example, OS processes, including the kernel, have no control over changes to, or access to, the rule policies, and therefore malware infecting an OS cannot gain access to the rule policies.

Figure 3:
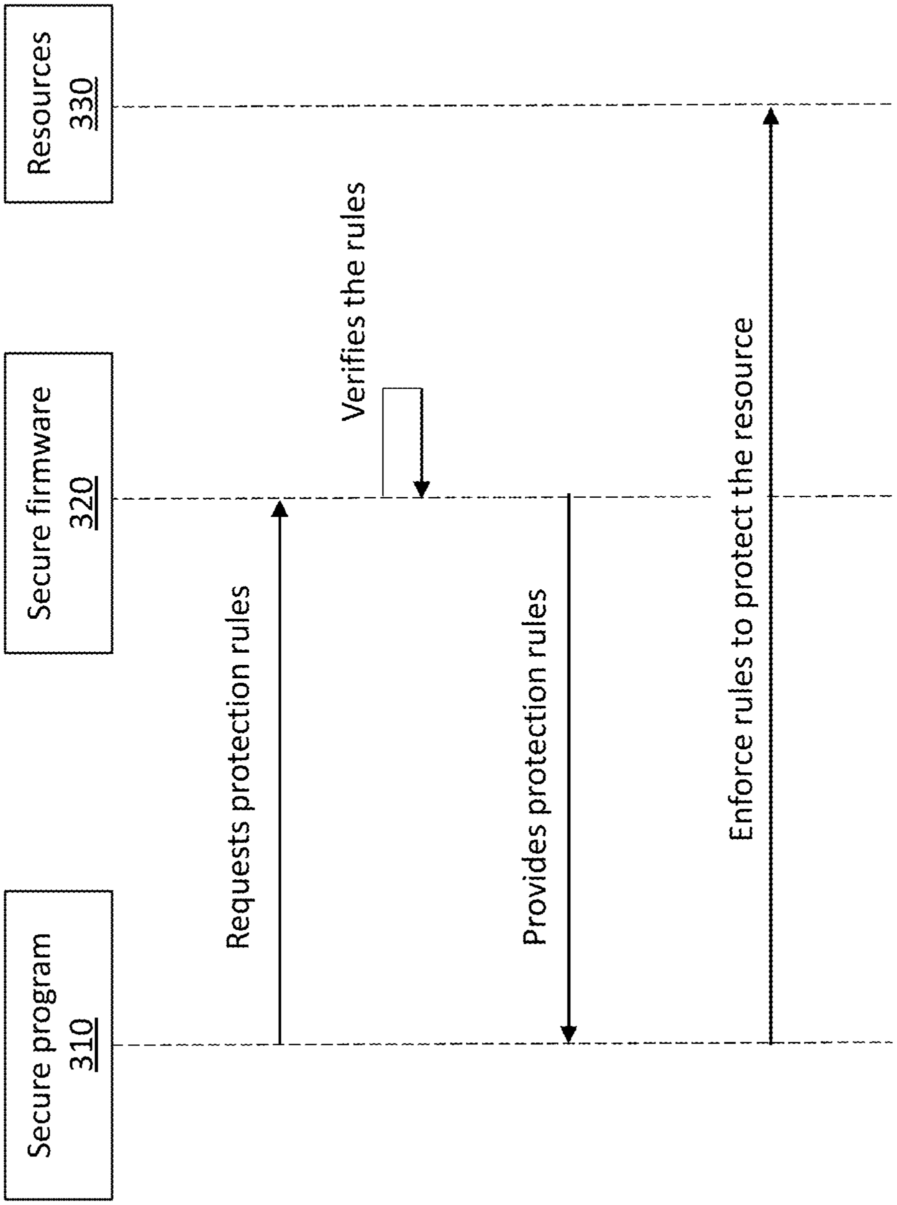
FIG. 3 illustrates an example flow between a secure program and a secure firmware for accessing and applying rules to protect resources on the computing device.

FIG. 3 illustrates an example flow between the secure program 310 and the secure firmware 320 for accessing and applying rules to protect resources 330 on the computing device. As illustrated in FIG. 3 and as explained herein, the secure firmware verifies the integrity of the rules, validates access requests to the rules, and accesses the rules from the privileged location. The secure program applies to the rules to specific requests from processes attempting to access specific resources covered by the rules, as explained more fully below.

Rules managed by the privileged firmware identify the specific resources to be protected by a rule. A rule can also identify additional information or policies associated with the rule. For example, a rule may identify an access type covered by the rule. For example, a request to modify, encrypt, move, or delete a file may be identified as subject to the rule (i.e., actions that require approval), while any access not identified (e.g., a read-only access, or a copy access, etc.) may not be subject to the rule. In particular embodiments, a rule may apply to any and all access types unless otherwise identified by the rule. In particular embodiments, a rule may identify an access duration associated with an access. For example, a rule may specify that if access is granted, then access may last for a predetermined time period (e.g., 5 minutes, 30 minutes, 1 hour, one day, etc.) or until some specified event (e.g., until the requesting process terminates access, until the computing device sleeps, shuts down, or reboots, etc.). In particular embodiments, a rule may identify one or more access options to present along with an access request to a companion device, as explained more fully below.

Step 120 of the example method of FIG. 1 includes receiving, by the computing device, a request from a process on the computing device to access at least one of the system resources identified in the set of rules. The process may be an application (e.g., a word-editing application, a video conferencing application, etc.) or may be an OS-level process, such as a request from a file system to move, delete, or otherwise access a particular file or folder. The request from the process to access the resource is received by, or otherwise sent to, the secure program, which inspects the rule policies obtained from the privileged firmware to determine whether any rules apply. If no rule applies, then access is granted to the process according to the typical procedures for that computing device. If a rule does apply to the requested resource, the secure program generates a notification to send to a companion (i.e., second) computing device to ensure that the resource is protected from malicious attacks.

Figure 4:
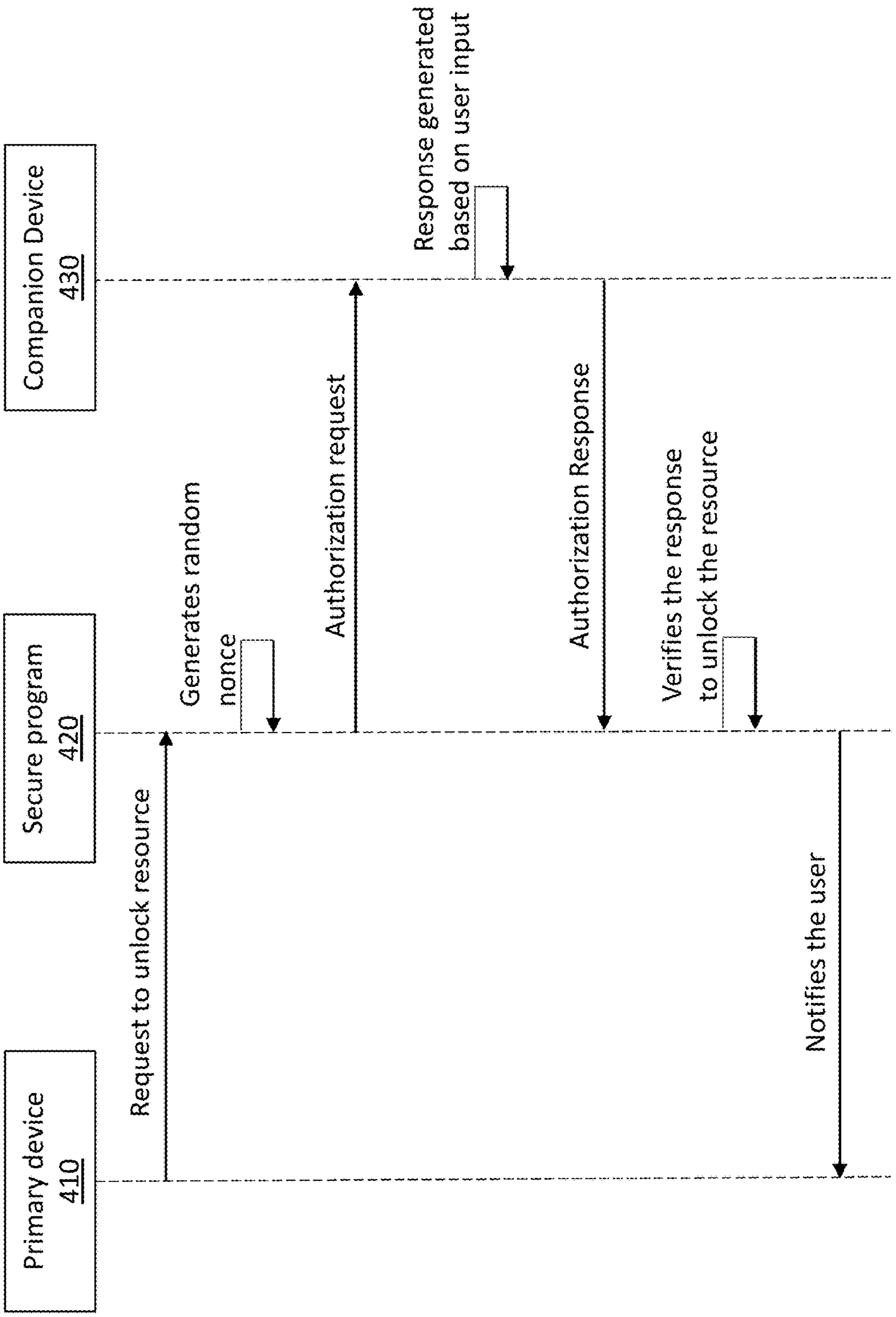
FIG. 4 illustrates an example approach for performing aspects of the example method of FIG. 1.

FIG. 4 illustrates an example approach for performing aspects of the example method of FIG. 1. As illustrated in FIG. 4, when a rule applies to an access request on a primary device 410, then the secure program 420 may generate a notification and may secure communications with a second (companion) device 430, for example by generating a random nonce to be used by the communication protocol with the companion device 430.

Step 130 of the example method of FIG. 1 includes transmitting, by the computing device, an access request to a second security program executing on a second computing device. For example, as illustrated in FIG. 2, the second (i.e., companion) computing device hosts an instance of the secure program. The access request from the primary computing device is sent to the companion device. The request is sent over a secure channel between the two devices. In particular embodiments, the keys decrypting the information sent over the secure channel are stored in a location on the primary device (e.g., device 210) and on the companion device (e.g., device 22) that is below the OS, i.e., that is accessible by only the privileged firmware of the respective devices. As a result, a traditional man-in-the-middle attack by malicious software executing on the primary device cannot circumvent the two-device authorization process, as even an infected OS has no access to the keys necessary to decrypt the communication.

The second device decrypts the access request from the primary device, and then the secure program on the companion device surfaces an interface (e.g., via a notification such as a push notification, an SMS message, and in-app UI, etc.) on the second device that notifies a user of the second device of the access request and provides relevant information related to the request. For example, the interface may identify the specific resource (e.g., file name, program, hardware component, etc.) for which access is requested. The interface may also identify the process on the primary computing device that is requesting access to the computing resource. The interface may also identify the requested access type, i.e., whether the request is to read, write, move, delete, active, etc. The interface includes one or more interactive elements that lets the user respond to the request on the companion device. For example, the user can approve or deny the request. In particular embodiments, the user can request additional information about the request. In particular embodiments, the interface includes options that a user can specify for approving or denying a request. For example, a user may be able to specify a duration of approval (e.g., that one request is granted for 5 minutes, while another request may be granted for several hours, etc.). In particular embodiments, the set of options which a user can select from when responding to an access request may be specified by the rule policies on the primary computing device. In particular embodiments, the interface may provide related information, such as a summary of the implications of granting the request (e.g., that the file may be copied, deleted, or encrypted if access is granted, etc.). In particular embodiments, the user of the second computing device is the same as the user of the primary computing device. In particular embodiments, the users may be different (e.g., the companion device is associated with an IT administrator).

Step 140 of the example method of FIG. 1 includes receiving, from the second security program, a response to the access request. The response to the request reflects the user interaction with the request on the second device, as discussed above. For example, the response identifies whether the access request is accepted, denied, or whether additional information is requested, in particular embodiments. As illustrated in FIG. 4, the secure program on the primary device may verify the response from the second device before acting on the response, for example by verifying a response to a challenge sent by the primary device to the second device.

Step 150 of the example method of FIG. 1 includes providing, by the security program and to the process on the computing device, access to the at least one system resource according to the received response. For example, if the request is denied by the user of the companion computing device, then step 150 includes denying the access request by the process. In the alternative, if the request is granted by the user of the companion computing device, then step 150 includes granting access to the request.

In particular embodiments, the secure program on a companion device may perform the functions for that device that the secure program on the primary device performs for the primary device. In other words, the secure program on a second device may secure access to computer resources on the second device, including by transmitting a request to another device for user authorization. From the perspective of the second device, the companion device may be the same computing device for which the second device serves as a companion device (e.g., device 210 may be the companion device for device 220 when the secure program on device 220 secures access to resources on that device), or may be a different device.

As explained above, the systems and methods of this disclosure protect computer resources from malware even if the computing device is already infected by malware, in part by including security features below the OS in connection with a secure program that operates as part of the OS, and in part by using a companion device with secure communications to authorize access to computer resources. This approach differs from other approaches, for example from multi-factor authentication, which focuses on authenticating the identity of users but does nothing to protect an infected system corrupting resources on that system. For example, two-factor authentication may require a user to authenticate their identity in order to login to a particular device, such as a laptop. However, once the user's identity is authenticated, an infected OS or other program associated with the user account has access to the computing device and associated resources, for example by spoofing administrative privileges and kernel-level processes on the computing device. In contrast, the system and methods of this disclosure operate downstream of any such authentication and prevent malware from corrupting or accessing computing resources on a device.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates particular components, devices, or systems carrying out particular steps of the method of FIG. 1, such as the computer system of FIG. 5, this disclosure contemplates any suitable combination of any suitable components, devices, or systems carrying out any suitable steps of the method of FIG. 1. Moreover, this disclosure contemplates that some or all of the computing operations described herein, including the steps of the example method illustrated in FIG. 1, may be performed by circuitry of a computing device, for example the computing device of FIG. 5, by a processor coupled to non-transitory computer readable storage media, or any suitable combination thereof.

Figure 5:
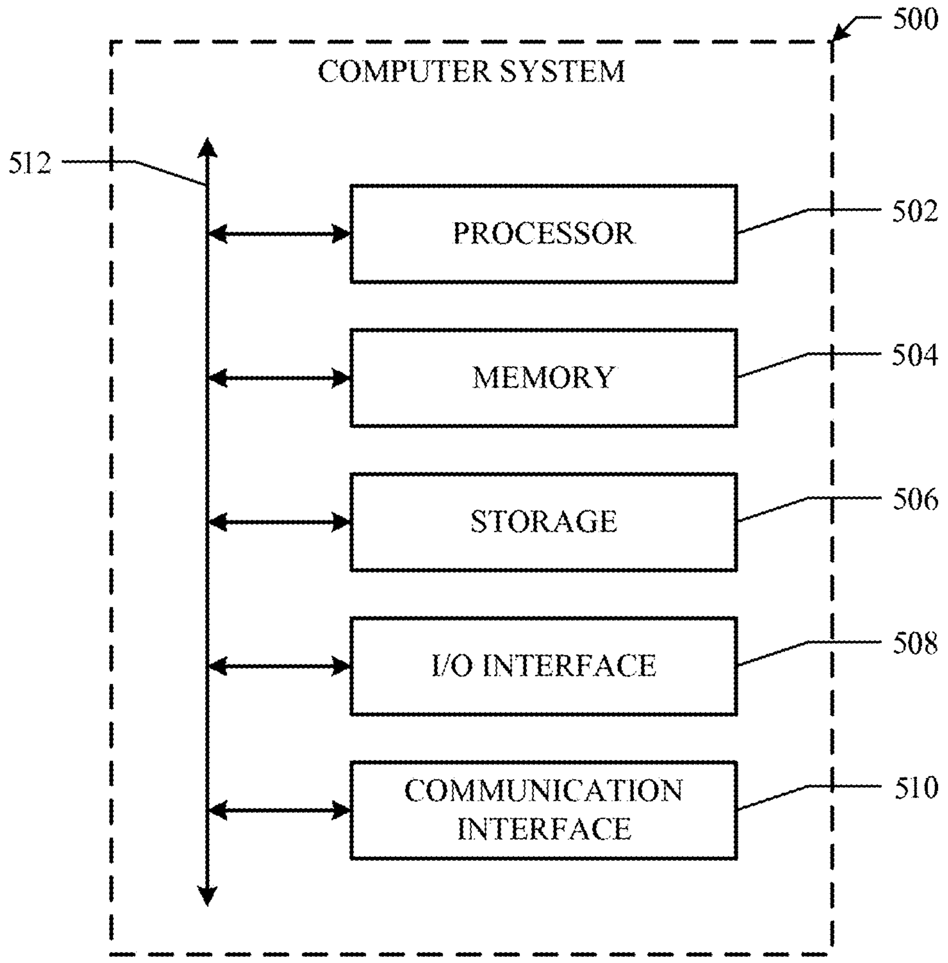
FIG. 5 illustrates an example computing system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packetbased communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:

applying, by a security program executing on a first computing device, a set of rules for one or more system resources of the first computing device, each rule (1) defining access to at least one of the one or more system resources and (2) stored in a privileged firmware environment of the first computing device that is not accessible by an operating system of the first computing device;

receiving, by the first computing device, a request from a process on the first computing device to access at least one of the system resources of the first computing device and identified in the set of rules;

determining, by the first computing device, that the request from the process on the first computing device to access the at least one of the system resources of the first computing device is subject to a rule in the set of rules;

transmitting, by the first computing device and after determining that the request from the process to access the at least one of the system resources of the first computing device is subject to a rule in the set of rules, and prior to granting or denying the access request from the process on the first computing device, a secure access request to a second security program executing on a second computing device, wherein the secure access request from the first computing device requests approval from the second computing device for the process on the first computing device to access the at least one of the system resources of the first computing device;

receiving, from the second security program, a response to the access request, wherein the response to the access request is based on user input to the second computing device; and providing, by the security program and to the process on the computing device, access to the at least one system resource according to the received response.

2. The method of claim 1, further comprising:

transmitting, by the security program and during a boot process of the first computing device, a request to a privileged system firmware to access the set of rules; and receiving, from the privileged system firmware, the set of rules.

3. The method of claim 1, wherein at least one rule in the set of rules identifies a system resource covered by that rule and one or more access types covered by that rule.

4. The method of claim 1, wherein at least one rule in the set of rules identifies a system resource covered by that rule and a duration of access for the associated system resource.

5. The method of claim 1, wherein at least one rule in the set of rules identifies a system resource covered by that rule and one or more access options associated with the access request.

6. The method of claim 1, wherein the access request comprises an identification of the process on the first computing device requesting access to the at least one system resource.

7. The method of claim 1, wherein the access request comprises one or more options for granting the access request.

8. The method of claim 1, wherein the one or more system resources include one or more of a file, a folder, an account, or a hardware component of the first computing device.

9. The method of claim 1, further comprising:

receiving, at the first computing device, a request from a user to modify the set of rules;

when the requested modification to the set of rules consists of adding one or more protections, then updating the set of rules according to the request; and when the requested modification to the set of rules comprises modifying or deleting a rule from the set of rules, then updating the set of rules based on an authentication of the request by a privileged system firmware.

10. One or more non-transitory computer readable storage media storing instructions and coupled to one or more processors that are operable to execute the instructions to:

apply, by a security program executing on a first computing device, a set of rules for one or more system resources of the first computing device, each rule (1) defining access to at least one of the one or more system resources and (2) stored in a privileged firmware environment of the first computing device that is not accessible by an operating system of the first computing device;

access, by the first computing device, a request from a process on the first computing device to access at least one of the system resources of the first computing device and identified in the set of rules;

determine, by the first computing device, that the request from the process on the first computing device to access the at least one of the system resources of the first computing device is subject to a rule in the set of rules;

provide, by the first computing device and after determining that the request from the process to access the at least one of the system resources of the first computing device is subject to a rule in the set of rules, and prior to granting or denying the access request from the process on the first computing device, a secure access request to a second security program executing on a second computing device, wherein the secure access request from the first computing device requests approval from the second computing device for the process on the first computing device to access the at least one of the system resources of the first computing device;

access, from the second security program, a response to the access request, wherein the response to the access request is based on user input to the second computing device; and provide, by the security program and to the process on the first computing device, access to the at least one system resource according to the received response.

11. The media of claim 10, further comprising instructions that are operable when executed by the one or more processors to:

provide, by the security program and during a boot process of the first computing device, a request to a privileged system firmware to access the set of rules; and receive, from the privileged system firmware, the set of rules.

12. The media of claim 10, wherein at least one rule in the set of rules identifies a system resource covered by that rule and one or more access types covered by that rule.

13. The media of claim 10, wherein at least one rule in the set of rules identifies a system resource covered by that rule and a duration of access for the associated system resource.

14. The media of claim 10, wherein at least one rule in the set of rules identifies a system resource covered by that rule and one or more access options associated with the access request.

15. The media of claim 10, wherein the access request comprises an identification of the process on the first computing device requesting access to the at least one system resource.

16. The media of claim 10, wherein the access request comprises one or more options for granting the access request.

17. The media of claim 10, wherein the one or more system resources include one or more of a file, a folder, an account, or a hardware component of the first computing device.

18. The media of claim 10, further comprising instructions that are operable when executed by the one or more processors to:

access, at the first computing device, a request from a user to modify the set of rules;

when the requested modification to the set of rules consists of adding one or more protections, then update the set of rules according to the request; and when the requested modification to the set of rules comprises modifying or deleting a rule from the set of rules, then update the set of rules based on an authentication of the request by a privileged system firmware.

19. A system comprising:

one or more non-transitory computer readable storage media storing instructions; and one or more processors coupled to the non-transitory computer readable storage media, the one or more processors operable to execute the instructions to:

apply, by a security program executing on a first computing device, a set of rules for one or more system resources of the first computing device, each rule (1) defining access to at least one of the one or more system resources and (2) stored in a privileged firmware environment of the first computing device that is not accessible by an operating system of the first computing device;

access, by the first computing device, a request from a process on the first computing device to access at least one of the system resources of the first computing device and identified in the set of rules;

determine, by the first computing device, that the request from the process on the first computing device to access the at least one of the system resources of the first computing device is subject to a rule in the set of rules;

provide, by the first computing device and after determining that the request from the process to access the at least one of the system resources of the first computing device is subject to a rule in the set of rules, and prior to granting or denying the access request from the process on the first computing device, a secure access request to a second security program executing on a second computing device, wherein the secure access request from the first computing device requests approval from the second computing device for the process on the first computing device to access the at least one of the system resources of the first computing device;

access, from the second security program, a response to the access request, wherein the response to the access request is based on user input to the second computing device; and provide, by the security program and to the process on the first computing device, access to the at least one system resource according to the received response.

20. The system of claim 19, wherein the one or more processors are further operable to execute the instructions to:

provide, by the security program and during a boot process of the first computing device, a request to a privileged system firmware to access the set of rules; and receive, from the privileged system firmware, the set of rules.

* * * * *